US012538402B2

United States Patent
Yan et al.

(10) Patent No.: US 12,538,402 B2
(45) Date of Patent: Jan. 27, 2026

(54) HIGH-VOLTAGE LIGHT STRING CONTROLLER

(71) Applicant: ZHEJIANG TWINSEL ELECTRONIC TECHNOLOGY CO., LTD., Ningbo (CN)

(72) Inventors: Jianping Yan, Ningbo (CN); Xueren Zeng, Ningbo (CN); Qian Xu, Ningbo (CN); Wei Yi, Ningbo (CN); Shiqing Xia, Ningbo (CN)

(73) Assignee: ZHEJIANG TWINSEL ELECTRONIC TECHNOLOGY CO., LTD., Ningbo (CN)

( * ) Notice: Subject to any disclaimer, the term of this patent is extended or adjusted under 35 U.S.C. 154(b) by 109 days.

(21) Appl. No.: 18/509,526

(22) Filed: Nov. 15, 2023

(65) Prior Publication Data
US 2024/0090101 A1    Mar. 14, 2024

(30) Foreign Application Priority Data
Nov. 18, 2022    (CN) .......................... 202223074989.X

(51) Int. Cl.
*H05B 45/52*    (2020.01)
*H05B 45/20*    (2020.01)
*H05B 47/16*    (2020.01)
*H05B 47/195*    (2020.01)

(52) U.S. Cl.
CPC ............ *H05B 45/52* (2020.01); *H05B 45/20* (2020.01); *H05B 47/16* (2020.01); *H05B 47/195* (2020.01)

(58) Field of Classification Search
CPC ........ H05B 45/52; H05B 45/20; H05B 47/16; H05B 47/195; H05B 45/30; H05B 47/25; Y02B 20/40
See application file for complete search history.

(56) References Cited

U.S. PATENT DOCUMENTS

| 2009/0273303 | A1 | 11/2009 | Peng |
| 2011/0285300 | A1 | 11/2011 | Yang |
| 2012/0056551 | A1 * | 3/2012 | Zhu .................... H02M 3/33507 315/254 |

(Continued)

FOREIGN PATENT DOCUMENTS

DE    102008053910 A1 *    5/2010    ............. H05B 47/11

OTHER PUBLICATIONS

English translation of DE-102008053910-A1 (Year: 2010).*

*Primary Examiner* — Daniel D Chang
(74) *Attorney, Agent, or Firm* — Zhigang Ma

(57) ABSTRACT

The present disclosure discloses a high-voltage light string controller, including a first power supply module, a main control module, and a protection module. The first power supply module is suitable for being connected to a mains supply to supply power to the main control module; the main control module is suitable for sending a control signal to a light string to turn on or turn off the light string or to switch a color; the protection module is suitable for identifying a magnitude of a current in the first power supply module, converting the current into a detection signal, and then sending the detection signal to the main control module; the main control module is suitable for receiving and judging the detection signal; and when the detection signal exceeds a preset value, the main control module is suitable for sending a control signal to turn off the light string.

13 Claims, 9 Drawing Sheets

(56) References Cited

U.S. PATENT DOCUMENTS

2013/0320872 A1* 12/2013 Li ........................ H05B 45/382
                                                          315/201
2014/0320030 A1   10/2014 Chiang
2016/0323949 A1* 11/2016 Lee ...................... H05B 45/385

* cited by examiner

HIGH-VOLTAGE LIGHT STRING CONTROLLER

TECHNICAL FIELD

The present disclosure relates to the technical field of lighting lamps, and in particular, to a high-voltage light string controller.

BACKGROUND

White-Red-Green-Blue (WRGB) light string is a lamp that is formed by serially connecting a plurality of light bulbs with WRGB LEDs. It is mainly used for decorative lighting, with adjustable lighting colors that can enhance the atmosphere. The WRGB light string is an indispensable decorative product in scenarios such as holiday celebrations, cultural exchanges, cultural activities, and illumination of nightscapes in public places. Compared to a common RGB light string, the WRGB light string is brighter and has better light transmittance and lower power consumption.

However, the existing high-voltage WRGB light string has the following defects: In order to enable the high-voltage WRGB light string to achieve practical functions such as on/off control and color adjustment, a controller is usually added, so that a control function can be integrated in the controller, and the controller can be used to perform simple and convenient adjustment operations on the light string. However, due to the fact that both the controller and the high-voltage WRGB light string use a mains power, when the light string is short-circuited, the controller is more likely to be damaged and has insufficient self-protection capability.

SUMMARY

One objective of the present disclosure is to provide a high-voltage light string controller which can be directly connected to a high-voltage mains supply and has good over-current protection capability.

In order to achieve the above objective, the technical solutions adopted in the present disclosure is as follows: A high-voltage light string controller includes a first power supply module, a main control module, and a protection module, wherein the first power supply module is suitable for being connected to a mains supply to supply power to the main control module; the main control module is suitable for sending a control signal to a light string to turn on or turn off the light string or to switch a color; the protection module is suitable for identifying a magnitude of a current in the first power supply module, converting the current into a detection signal, and then sending the detection signal to the main control module; the main control module is suitable for receiving and judging the detection signal; and when the detection signal exceeds a preset value, the main control module is suitable for sending a control signal to turn off the light string.

As an improvement, the controller further includes a photosensitive timing module; the photosensitive timing module is suitable for sending a photosensitive signal to the main control module by sensing external light, and the main control module is suitable for receiving the photosensitive signal and sending a control signal instantly or in a delayed manner to turn on or turn off the light string.

As an improvement, the protection module includes a conversion circuit and a detection circuit; the detection signal includes a level signal; the conversion circuit is suitable for obtaining the current at the first power supply module and converting the current into a voltage; the detection circuit is suitable for obtaining the voltage at the conversion circuit, converting the voltage into the level signal, and sending the level to the main control module; and the main control module is suitable for receiving and judging a magnitude of the level signal.

As an improvement, the conversion circuit includes a first conversion resistor and a second conversion resistor; the first conversion resistor and the second conversion resistor are connected in parallel to the first power supply module; and the detection circuit is suitable for obtaining a voltage at two ends of the first conversion resistor and the second conversion resistor.

As an improvement, the controller further includes a switch module; the switch module is connected to the main control module, the first power supply module, and the light string; and the switch module is suitable for turning off or turning on power of the first power supply module to the light string when receiving the control signal.

As an improvement, the main control module is provided with a memory module; the memory module is suitable for storing a running state of the main control module before power outage; and the memory module is suitable for restoring the running state before power outage after the main control module is re-energized.

As an improvement, a first resistance-capacitance step-down circuit or a constant-current circuit is arranged in the first power supply module.

As an improvement, the controller is provided with a first connector and a second connector; the first connector is suitable for being connected to a power source; the second connector is suitable for being detachably abutted with the light string; the controller is provided with an indicator lamp; the indicator lamp is configured to display an on/off state of the light string; the main control module is connected in parallel with a filtering circuit; the main control module is provided with a first control pin, a second control pin, a detection pin, a photosensitive pin, and an indication pin; the first control pin is suitable for emitting the control signal; the main control module is connected to a color adjustment switch; the second control pin is suitable for receiving a signal of the color adjustment switch; the detection pin is suitable for receiving the detection signal; the photosensitive pin is suitable for receiving the photosensitive signal; and the indication pin is suitable for sending an indication signal to the indicator lamp.

Compared with the prior art, beneficial effects of the present disclosure are as follows: The controller can be directly connected to the mains power for operation and use. After being connected to the light string, the controller can achieve various functions, such as photosensitive timing, over-current protection, and memorization, and the practicality is improved. The photosensitive timing module can sense the brightness of the external light and achieve automatic turning on and turning off of the light string, without manual control, which is more intelligent and energy-saving. The over-current protection module can detect the magnitude of the current passing through the controller to better protect the controller and avoid damage to the controller caused by a short circuit and the like in the light string. The memory module can store the running state of the controller before power outage, so that the controller can maintain the running state before power outage after being re-energized, without adjustment again, and controller is more convenient to use.

Figure 1:
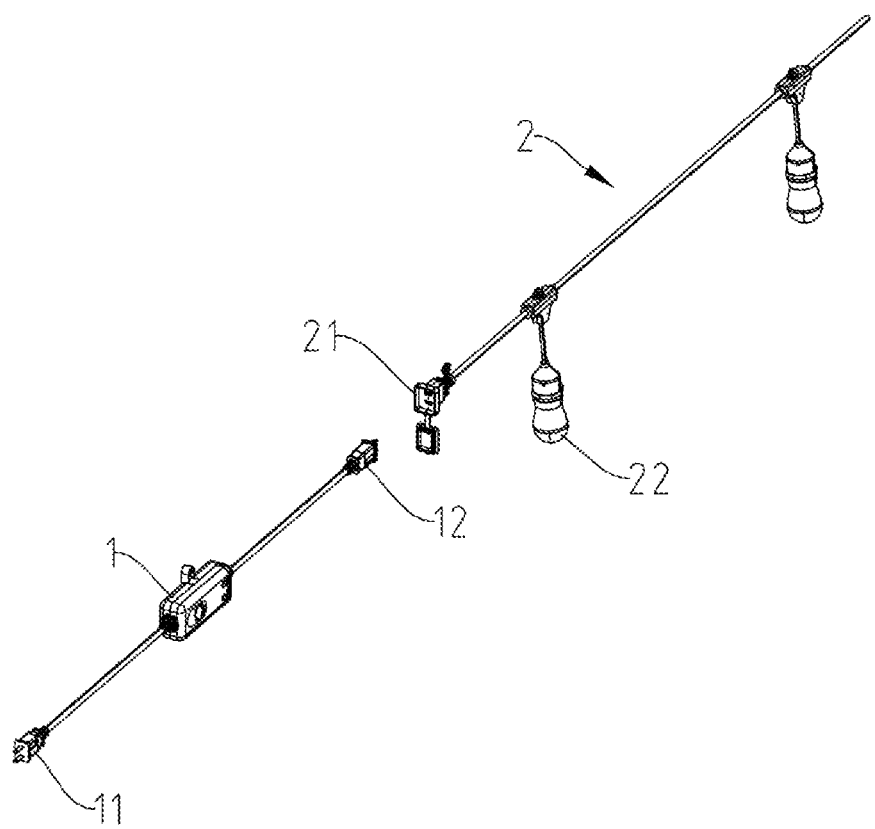
FIG. 1 is a schematic diagram of connection according to one preferred embodiment of the present disclosure.
Figure 2:
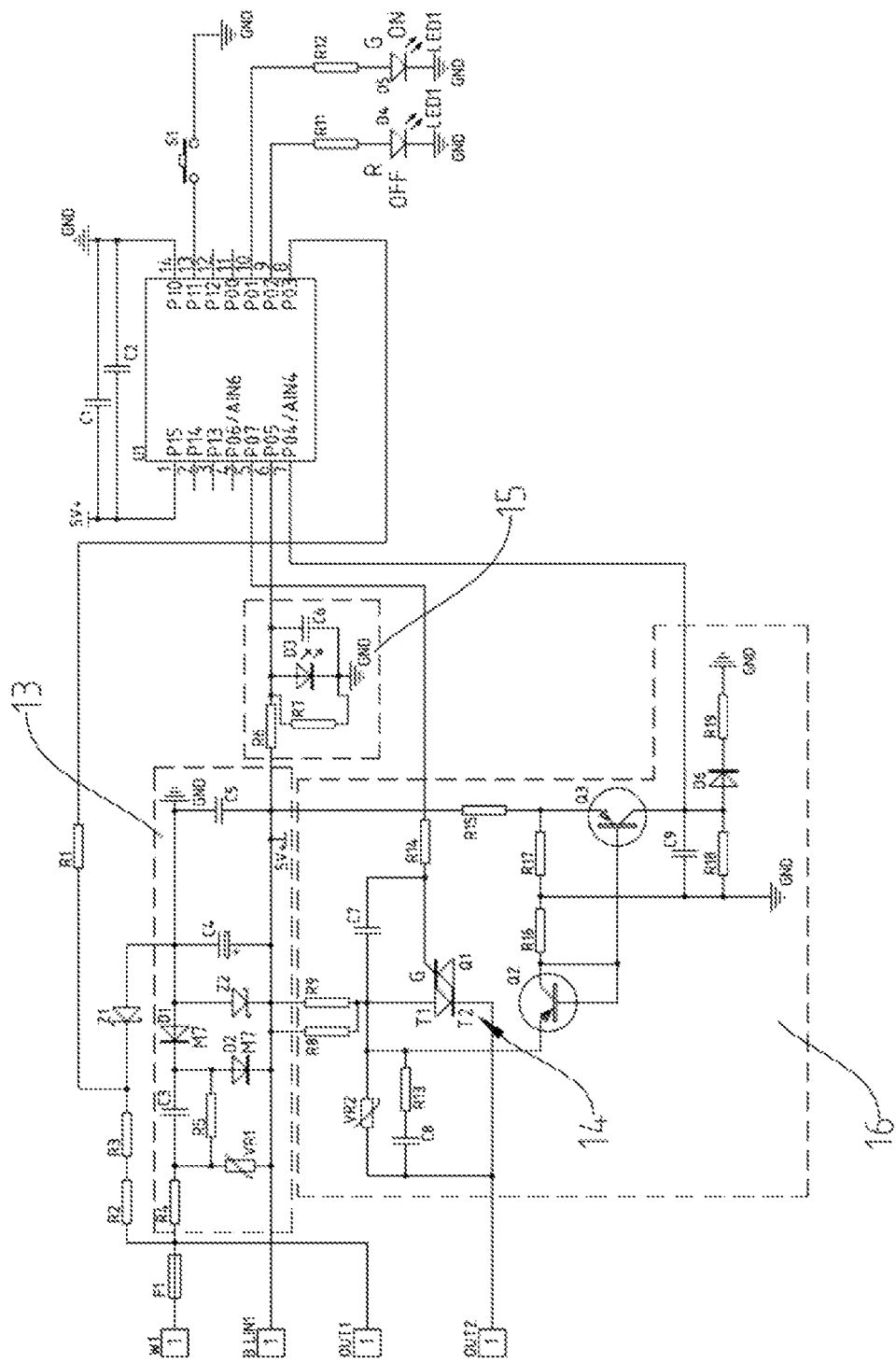
FIG. 2 is a schematic diagram of a circuit of a controller according to one preferred embodiment of the present disclosure.
Figure 3:
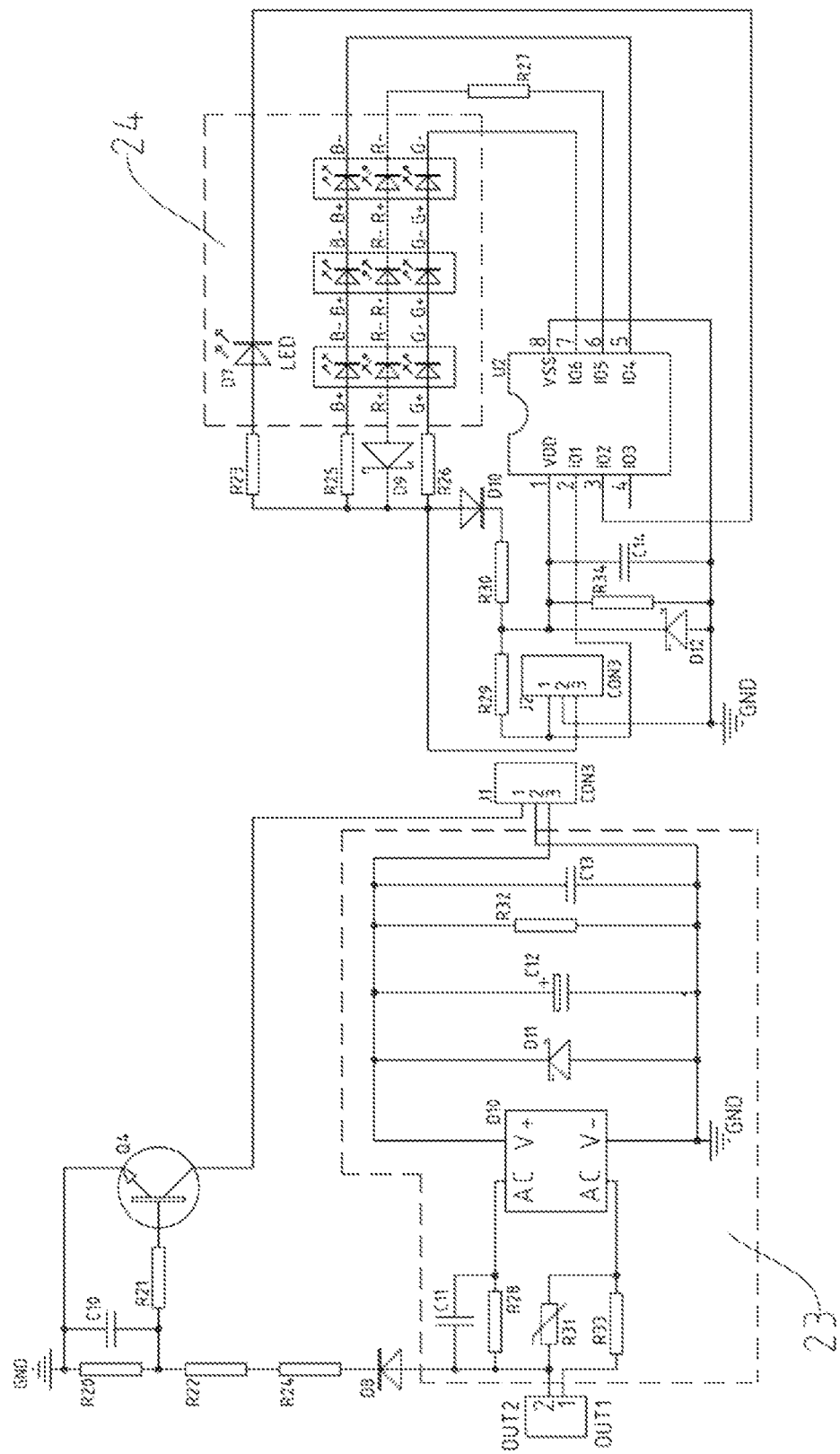
FIG. 3 is a schematic diagram of a circuit of a WRGB light bulb according to one preferred embodiment of the present disclosure.
Figure 4:
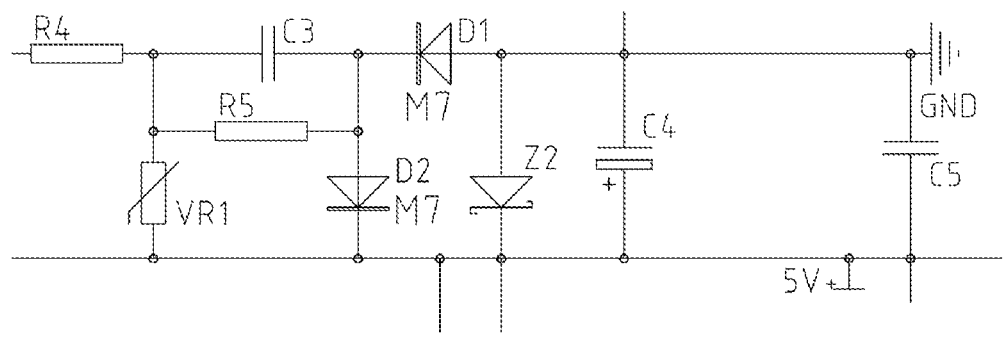
FIG. 4 is a schematic diagram of a circuit of a first power supply module according to one preferred embodiment of the present disclosure.

In the drawings: 1: controller; 11: first connector; 12: second connector; 13: first power supply module; 14: switch module; 15: photosensitive timing module; 16: protection module; 17: filtering circuit; 2: light string; 21: third connector; 22: WRGB light bulb; 23: second power supply module; and 24: light module.

DETAILED DESCRIPTION OF THE EMBODIMENTS

The present disclosure is further described below in combination with specific implementations. It should be noted that all embodiments or all technical features described below can be combined arbitrarily to form new embodiments.

In the descriptions of the present disclosure, it should be noted that orientations or positional relationships indicated by the localizers, such as "center", "transverse", "longitudinal", "length", "width", "thickness", "up", "down", "front", "rear", "left", "right", "vertical", "horizontal", "top", "bottom", "inner", "outer", "clockwise", and "anti-clockwise", are orientations or positional relationships as shown in the drawings, and are only for the purpose of facilitating and simplifying the descriptions of the present disclosure instead of indicating or implying that devices or elements indicated must have particular orientations, and be constructed and operated in the particular orientations, so that these terms are not construed as limiting the specific protection scope of the present disclosure.

It should be noted that terms "first" and "second" in this specification and claims of the present disclosure are used to distinguish similar objects, but are unnecessarily used to describe a specific sequence or order.

The terms "include" and "have" in the specification and claims of the present disclosure, as well as any variations thereof, are intended to cover non-exclusive inclusion. For example, a process, method, system, product, or equipment that includes a series of steps or units does not need to be limited to those clearly listed steps or units, but may include other steps or units not clearly listed or inherent to these processes, methods, products, or equipment.

The present disclosure will be explained below in conjunction with the accompanying drawings:

As shown in FIG. 1 to FIG. 9, a preferred embodiment of the present disclosure includes a controller 1 and a light string 2. The controller 1 and the light string 2 are detachably connected for easy mounting and storage. The controller 1 is provided with a first connector 11 and a second connector 12, and the light string 2 is provided with a third connector 21. The first connector 11 is suitable for being connected to a power source. The third connector 21 is suitable for being connected to the power source. The second connector 12 is suitable for being in separable electrical connection with the third connector 21. The first connector 11, the second connector 12, and the third connector 21 can be easily disassembled and connected using standard or non-standard end plugs. Especially when the controller 1 and the light string 2 use the standard end plugs, the light string 2 can be directly connected to a mains supply and used as an ordinary light string 2. In this state, there is no synchronization and memorization function. Or, the light string can be connected to the controller 1. In this state, functions such as turning on, turning off, color adjustment and switching, and synchronization of the light string 2 can be achieved. The controller 1 can directly operate the light string 2 to easily select the functions of the light string 2. There is no need to worry that the light string 2 cannot be controlled without a WIFI network or as a remote controller is lost.

As shown in FIG. 2 to FIG. 5, a plurality of WRGB light bulbs 22 are arranged on the light string 2. The controller 1 includes a first power supply module 13 and a main control module U1. The first power supply module 13 is suitable for being connected to a mains power to supply power to the main control module U1. The WRGB light bulb 22 includes a second power supply module 23, a secondary control module U2, and a light module 24. The second power supply module 23 is suitable for being connected to the controller 1 or the mains power to supply power to the secondary control module U2 and the light module 24. The main control module U1 is suitable for sending a control signal to the secondary control module U2 to turn on or turn off the light module 24 or to switch a color. By use of a two-wire-core design of the first power supply module 13 and the second power supply module 23, the functions of a lamp bulb can be controlled using an alternating current mains supply.

The light module 24 is provided with a plurality of LEDs, preferably four LEDs. The four LEDs correspondingly display four colors: White, Red, Green, and Blue, achieving a WRGB color development technology.

The main control module U1 can send the control signal. The control signal uses a mains supply frequency, such as 50 HZ and 60 HZ, to set a code value. Different code values represent different functions. Various functions, such as color switching, photosensitive timing, and memorization of the light module 24, can be achieved after the secondary control module U2 receives and decodes the control signal There are a few of WRGB light strings 2 that can be formed by connecting five or more light strings on the market, and a quantity of strings is generally less than four. The light string 2 in the present disclosure can be formed by connecting ten strings. The powers and brightnesses of the light modules 24 at the head and tail can be kept consistent, without a phenomenon that the head end is bright and the tail end is dark because of a voltage drop of a low-voltage lamp.

A first resistance-capacitance step-down circuit is arranged in the first power supply module 13, and a second resistance-capacitance step-down circuit is arranged in the second power supply module 23. The power and current of the first power supply module 13 after voltage reduction can satisfy operation of the main control module U1, while the power and current of the second power supply module 23 after voltage reduction can satisfy operations of both the auxiliary control module U2 and the light module 24.

Figure 5:
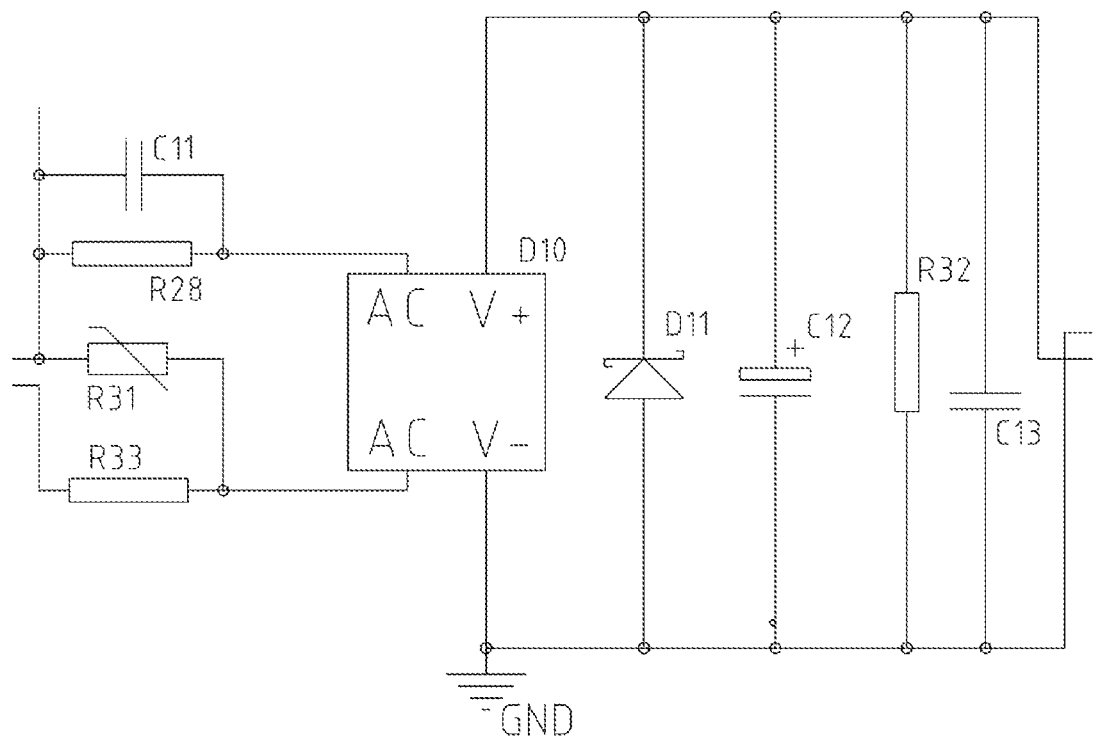
FIG. 5 is a schematic diagram of a circuit of a second power supply module according to one preferred embodiment of the present disclosure.

As shown in FIG. 5, a bridge rectifier D10 for rectification is arranged on the second resistance-capacitance step-down circuit, which can convert the alternating current mains supply into direct current power, thereby supplying power to the auxiliary control module U2 and the light module 24.

Figure 8:
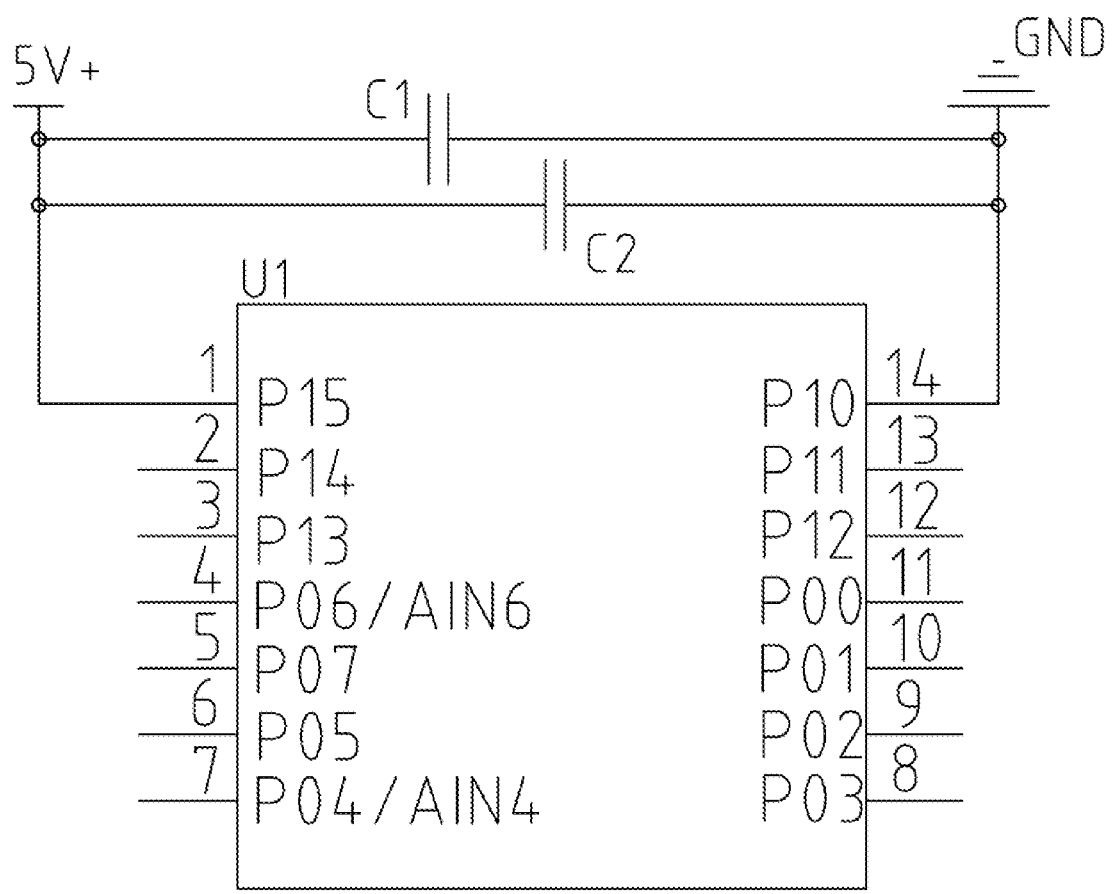
FIG. 8 is a schematic diagram of a circuit of a main control module according to one preferred embodiment of the present disclosure.

As shown in FIG. 8, the controller 1 is provided with an indicator lamp. The indicator lamp is connected to the main control module U1. The indicator lamp is configured to display an on/off state of the light string 2. The indicator lamp is preferably an LED lamp, and a quantity of the indicator lamps is preferably two. One indicator lamp is an OFF indicator lamp D4, and the other indicator lamp is an ON indicator lamp D5, which can visually display a running state of the controller 1 for easy observation.

The main control module U1 is connected in parallel with a filtering circuit 17, and the filtering circuit 17 is composed of a capacitor C1 and a capacitor C2, which can reduce interference, so that the main control module U1 runs more stably.

The main control module U1 is provided with a first control pin P07, a second control pin P11, a detection pin P04, a photosensitive pin P05, an indication pin P01, and an indication pin P02; the first control pin P07 is suitable for emitting the control signal; the controller 1 is provided with a color adjustment switch S1; the main control module U1 is electrically connected to the color adjustment switch S1; the second control pin P11 is suitable for receiving a signal of the color adjustment switch S1; the detection pin P04 is suitable for receiving the detection signal; the photosensitive pin P05 is suitable for receiving the photosensitive signal; and the indication pin P01 and the indication pin P02 are suitable for sending indication signals to the ON indicator lamp D5 and the OFF indicator lamp D4.

A quantity of the pins of the main control module U1 may be different from a quantity of pins of the auxiliary control module U2, and functions of the pins may also have different definitions, as long as the quantity of the pins can meet the use of the above functions.

Figure 7:
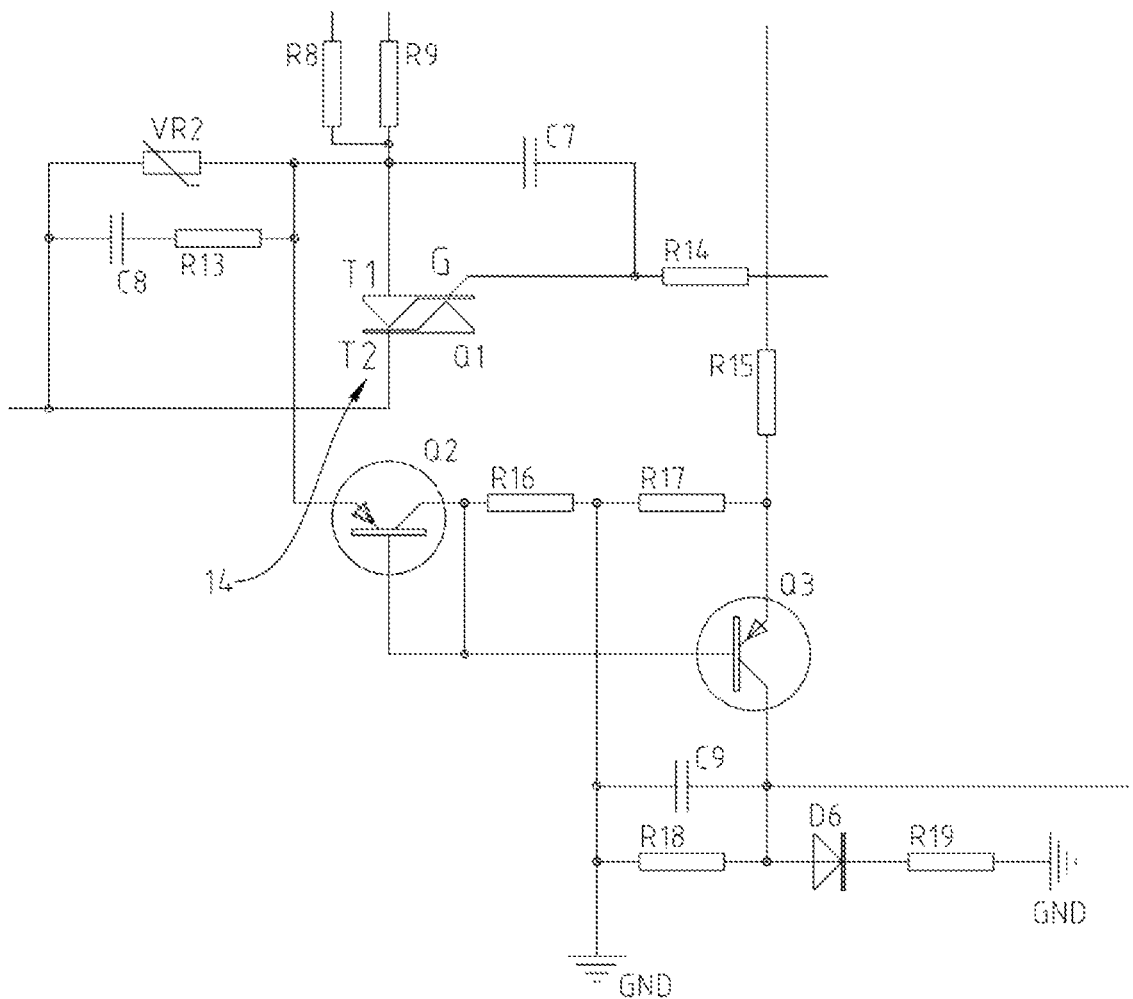
FIG. 7 is a schematic diagram of a circuit of a first protection module according to one preferred embodiment of the present disclosure.

As shown in FIG. 7, the controller 1 further includes a switch module 14. The switch module 14 preferably uses a bidirectional trigger diode Q1. The switch module 14 is connected to the main control module U1, the first power supply module 13, and the second power supply module 23. The switch module 14 can implement switching on and switching off according to the control signal sent by the main control module U1. The switch module 14 is suitable for turning off or turning on power of the first power supply module 13 to the second power supply module 23 when receiving the control signal.

Figure 6:
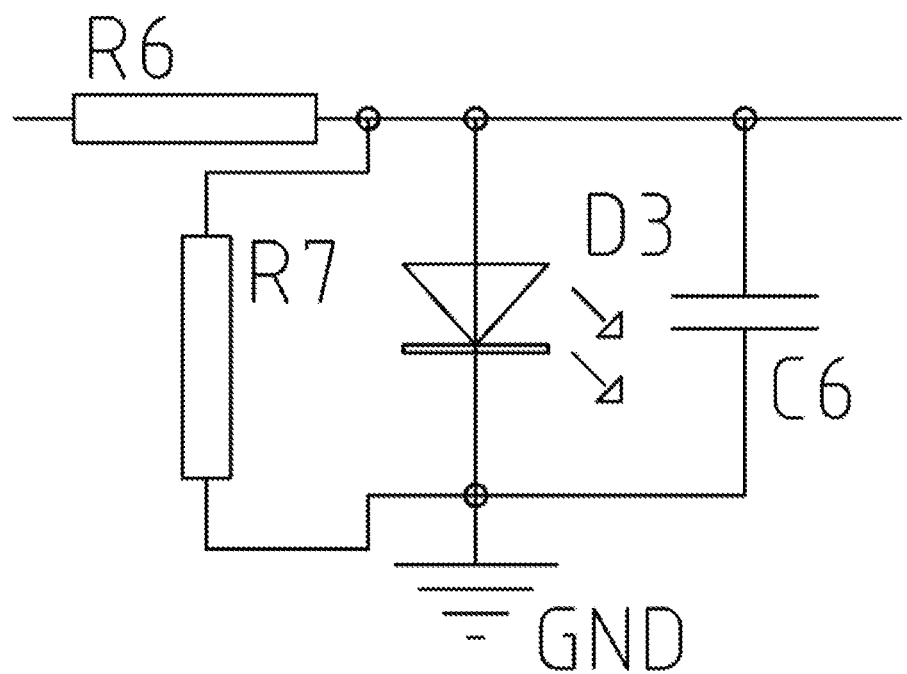
FIG. 6 is a schematic diagram of a circuit of a photosensitive timing module according to one preferred embodiment of the present disclosure.

As shown in FIG. 6, the controller 1 further includes a photosensitive timing module 15. A photodiode D3 is arranged in the photosensitive timing module 15. The photodiode D3 can generate a current or voltage signal under illumination. The current or voltage signal at this time is a photosensitive signal. The photosensitive timing module 15 is suitable for sending the photosensitive signal to the main control module U1 by sensing external light, and the main control module U1 is suitable for receiving the photosensitive signal through the photosensitive pin P05 and then sending the control signal to the switch module 14 instantly or in a delayed manner through the first control pin P07 to control switching on and switching off of the bidirectional trigger diode Q1, so as to achieve photosensitive control and timing control of the WRGB light bulbs 22. The photosensitive timing module 15 is composed of a resistor R6, a resistor R7, the photodiode D3, and a capacitor C6.

As shown in FIG. 7, the controller 1 further includes a protection module 16. The protection module 16 is suitable for identifying a magnitude of a current in the first power supply module 13, converting the current into a detection signal, and then sending the detection signal to the main control module U1. The main control module U1 is suitable for receiving and judging the detection signal. The main control module U1 is suitable for sending a control signal to the switch module 14 when the detection signal exceeds a preset value, and controlling the switching on and switching off of the bidirectional trigger diode Q1 to power off the second power supply module 23, thus turning off the WRGB light bulbs 22.

The protection module 16 includes a conversion circuit and a detection circuit; the detection signal includes a level signal; the conversion circuit is suitable for obtaining the current at the first power supply module 13 and converting the current into a voltage; the detection circuit is suitable for obtaining the voltage at the conversion circuit, converting the voltage into the level signal, and sending the level to the main control module U1; and the main control module U1 is suitable for receiving and judging a magnitude of the level signal.

The conversion circuit includes a first conversion resistor R8 and a second conversion resistor R9; the first conversion resistor R8 and the second conversion resistor R9 are connected in parallel to the first power supply module 13; and the detection circuit is suitable for obtaining a voltage at two ends of the first conversion resistor R8 and the second conversion resistor R9.

The protection module 16 can detect a current flowing through the first conversion resistor R8 and the second conversion resistor R9. When the current reaches a certain value, the voltage at the two ends of the first conversion resistor R8 and the second conversion resistor R9 will reach a threshold, and then the detection circuit composed of a resistor R15, a resistor R16, a resistor R17, a transistor Q2, a transistor Q3, a capacitor C9, a resistor R18, a unidirectional diode D6, and a resistor R19 may transmit the voltage value to the detection pin P04, so that the main control module U1 determines a magnitude of the level and send corresponding control signals to control the switching on and switching off of the bidirectional trigger diode Q1, to achieve over-current protection.

The main control module U1 is provided with a memory module; the memory module is implemented by configuring a program in the main control module U1. The memory module is suitable for storing a running state of the main control module U1 before power outage; and the memory module is suitable for restoring the running state before power outage after the main control module U1 is re-energized.

Figure 9:
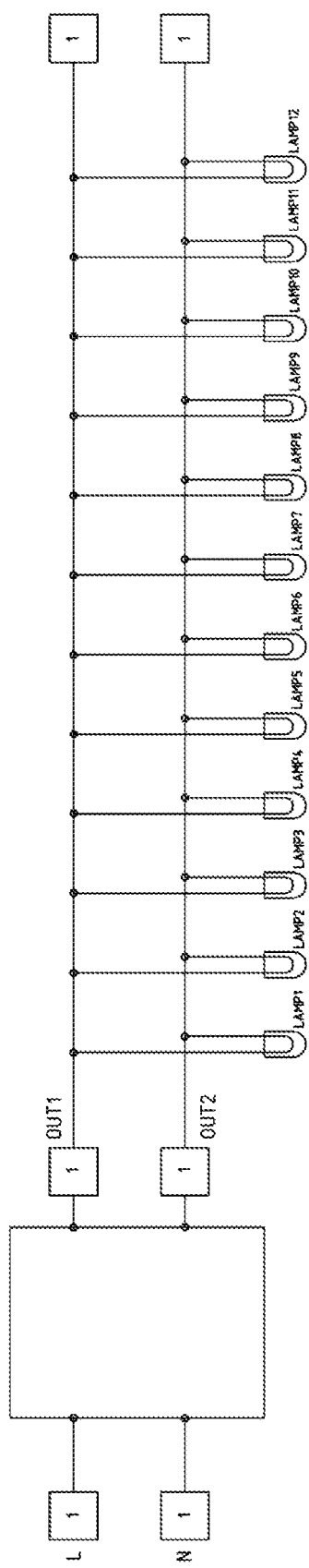
FIG. 9 is a schematic diagram of connection between a controller and a WRGB light bulb according to one preferred embodiment of the present disclosure.

As shown in FIG. 9, the controller 1 of the present disclosure may be connected to two wires OUT1 and OUT2, serving as a positive electrode and a negative electrode of the WRGB light bulbs 22 respectively. The plurality of WRGB light bulbs 22 are connected in parallel to the two wires OUT1 and OUT2 to achieve energization.

The first power supply module 13 and the second power supply module 23 of another preferred embodiment of the present disclosure are powered by a constant-current circuit. The WRGB light bulbs 22 are more stable in operation and less prone to fluctuations, are not easy to fail and damage, and do not strobe.

The above describes the basic principle, main features, and advantages of the present disclosure. Technicians in this industry should understand that the present disclosure is not limited by the embodiments described above. The embodiments described above and the specification only describe the principles of the present disclosure. The present disclosure will also have various changes and improvements without departing from the spirit and scope of the present disclosure, and these changes and improvements shall all fall within the claimed scope of the present disclosure. The protection scope of the present disclosure is defined by the attached claims and their equivalents.

What is claimed is:

1. A high-voltage light string controller, comprising a first power supply module, a main control module, and a protection module, wherein the first power supply module is configured for being connected to a mains supply to supply power to the main control module; the main control module is configured for sending a control signal to a light string to turn on or turn off the light string or to switch a color; the protection module is configured for identifying a magnitude of a current in the first power supply module, converting the current into a detection signal, and then sending the detection signal to the main control module; the main control module is configured for receiving and judging the detection signal; and when the detection signal exceeds a preset value, the main control module is configured for sending a control signal to turn off the light string;

wherein the protection module comprises a conversion circuit and a detection circuit; the detection signal comprises a level signal; the conversion circuit is configured for obtaining the current at the first power supply module and converting the current into a voltage; the detection circuit is configured for obtaining the voltage at the conversion circuit, converting the voltage into the level signal, and sending the level to the main control module; and the main control module is configured for receiving and judging a magnitude of the level signal.

2. The high-voltage light string controller according to claim 1, wherein the controller further comprises a photosensitive timing module; the photosensitive timing module is configured for sending a photosensitive signal to the main control module by sensing external light, and the main control module is configured for receiving the photosensitive signal and sending a control signal instantly or in a delayed manner to turn on or turn off the light string.

3. The high-voltage light string controller according to claim 2, wherein the controller is provided with a first connector and a second connector; the first connector is configured for being connected to a power source; the second connector is configured for being detachably abutted with the light string; the controller is provided with an indicator lamp; the indicator lamp is configured to display an on/off state of the light string; the main control module is connected in parallel with a filtering circuit; the main control module is provided with a first control pin, a second control pin, a detection pin, a photosensitive pin, and an indication pin; the first control pin is suitable-configured for emitting the control signal; the main control module is connected to a color adjustment switch; the second control pin is configured for receiving a signal of the color adjustment switch; the detection pin is configured for receiving the detection signal; the photosensitive pin is configured for receiving the photosensitive signal; and the indication pin is configured for sending an indication signal to the indicator lamp.

4. The high-voltage light string controller according to claim 1, wherein the conversion circuit comprises a first conversion resistor and a second conversion resistor; the first conversion resistor and the second conversion resistor are connected in parallel to the first power supply module; and the detection circuit is configured for obtaining a voltage at two ends of the first conversion resistor and the second conversion resistor.

5. The high-voltage light string controller according to claim 4, wherein the controller is provided with a first connector and a second connector; the first connector is configured for being connected to a power source; the second connector is configured for being detachably abutted with the light string; the controller is provided with an indicator lamp; the indicator lamp is configured to display an on/off state of the light string; the main control module is connected in parallel with a filtering circuit; the main control module is provided with a first control pin, a second control pin, a detection pin, a photosensitive pin, and an indication pin; the first control pin is configured for emitting the control signal; the main control module is connected to a color adjustment switch; the second control pin is configured for receiving a signal of the color adjustment switch; the detection pin is configured for receiving the detection signal; the photosensitive pin is configured for receiving the photosensitive signal; and the indication pin is configured for sending an indication signal to the indicator lamp.

6. The high-voltage light string controller according to claim 1, wherein the controller is provided with a first connector and a second connector; the first connector is configured for being connected to a power source; the second connector is configured for being detachably abutted with the light string; the controller is provided with an indicator lamp; the indicator lamp is configured to display an on/off state of the light string; the main control module is connected in parallel with a filtering circuit; the main control module is provided with a first control pin, a second control pin, a detection pin, a photosensitive pin, and an indication pin; the first control pin is configured for emitting the control signal; the main control module is connected to a color adjustment switch; the second control pin is configured for receiving a signal of the color adjustment switch; the detection pin is configured for receiving the detection signal; the photosensitive pin is configured for receiving the photosensitive signal; and the indication pin is configured for sending an indication signal to the indicator lamp.

7. The high-voltage light string controller according to claim 1, wherein the controller further comprises a switch module; the switch module is connected to the main control module, the first power supply module, and the light string; and the switch module is configured for turning off or turning on power of the first power supply module to the light string when receiving the control signal.

8. The high-voltage light string controller according to claim 7, wherein the controller is provided with a first connector and a second connector; the first connector is configured for being connected to a power source; the second connector is configured for being detachably abutted with the light string; the controller is provided with an indicator lamp; the indicator lamp is configured to display an on/off state of the light string; the main control module is connected in parallel with a filtering circuit; the main control module is provided with a first control pin, a second control pin, a detection pin, a photosensitive pin, and an indication pin; the first control pin is configured for emitting the control signal; the main control module is connected to a color adjustment switch; the second control pin is configured for receiving a signal of the color adjustment switch; the detection pin is configured for receiving the detection signal; the photosensitive pin is configured for receiving the photosensitive signal; and the indication pin is configured for sending an indication signal to the indicator lamp.

9. The high-voltage light string controller according to claim 1, wherein the main control module is provided with a memory module; the memory module is configured for storing a running state of the main control module before power outage; and the memory module is configured for restoring the running state before power outage after the main control module is re-energized.

10. The high-voltage light string controller according to claim 9, wherein the controller is provided with a first connector and a second connector; the first connector is configured for being connected to a power source; the second connector is configured for being detachably abutted with the light string; the controller is provided with an indicator lamp; the indicator lamp is configured to display an on/off state of the light string; the main control module is connected in parallel with a filtering circuit; the main control module is provided with a first control pin, a second control pin, a detection pin, a photosensitive pin, and an indication pin; the first control pin is configured for emitting the control signal; the main control module is connected to a color adjustment switch; the second control pin is configured for receiving a signal of the color adjustment switch; the detection pin is configured for receiving the detection signal; the photosensitive pin is configured for receiving the photosensitive signal; and the indication pin is configured for sending an indication signal to the indicator lamp.

11. The high-voltage light string controller according to claim 1, wherein a first resistance-capacitance step-down circuit or a constant-current circuit is arranged in the first power supply module.

12. The high-voltage light string controller according to claim 11, wherein the controller is provided with a first connector and a second connector; the first connector is configured for being connected to a power source; the second connector is configured for being detachably abutted with the light string; the controller is provided with an indicator lamp; the indicator lamp is configured to display an on/off state of the light string; the main control module is connected in parallel with a filtering circuit; the main control module is provided with a first control pin, a second control pin, a detection pin, a photosensitive pin, and an indication pin; the first control pin is configured for emitting the control signal; the main control module is connected to a color adjustment switch; the second control pin is configured for receiving a signal of the color adjustment switch; the detection pin is configured for receiving the detection signal; the photosensitive pin is configured for receiving the photosensitive signal; and the indication pin is configured for sending an indication signal to the indicator lamp.

13. The high-voltage light string controller according to claim 1, wherein the controller is provided with a first connector and a second connector; the first connector is configured for being connected to a power source; the second connector is configured for being detachably abutted with the light string; the controller is provided with an indicator lamp; the indicator lamp is configured to display an on/off state of the light string; the main control module is connected in parallel with a filtering circuit; the main control module is provided with a first control pin, a second control pin, a detection pin, a photosensitive pin, and an indication pin; the first control pin is configured for emitting the control signal; the main control module is connected to a color adjustment switch; the second control pin is configured for receiving a signal of the color adjustment switch; the detection pin is configured for receiving the detection signal; the photosensitive pin is configured for receiving the photosensitive signal; and the indication pin is configured for sending an indication signal to the indicator lamp.

\* \* \* \* \*